United States Patent
Ohkubo et al.

(10) Patent No.: US 8,041,340 B2
(45) Date of Patent: Oct. 18, 2011

(54) PERSONAL INFORMATION PROTECTING METHOD AND MOBILE TERMINAL

(75) Inventors: Shinzo Ohkubo, Yokosuka (JP); Hirobumi Nakayama, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 984 days.

(21) Appl. No.: 11/692,705

(22) Filed: Mar. 28, 2007

(65) Prior Publication Data

US 2007/0232270 A1    Oct. 4, 2007

(30) Foreign Application Priority Data

Mar. 28, 2006 (JP) .............................. P2006-089440

(51) Int. Cl.
*H04M 1/66* (2006.01)
(52) U.S. Cl. ....................... 455/411; 455/410
(58) Field of Classification Search .................. 455/410, 455/411
See application file for complete search history.

(56) References Cited

U.S. PATENT DOCUMENTS

| | | | |
|---|---|---|---|
| 6,151,493 A | 11/2000 | Sasakura et al. | |
| 2002/0002066 A1* | 1/2002 | Pallonen | 455/562 |
| 2004/0005910 A1* | 1/2004 | Tom | 455/558 |
| 2004/0005912 A1* | 1/2004 | Hubbe et al. | 455/558 |
| 2004/0203895 A1* | 10/2004 | Balasuriya | 455/456.1 |
| 2005/0159184 A1* | 7/2005 | Kerner et al. | 455/558 |
| 2007/0129057 A1* | 6/2007 | Xu et al. | 455/410 |

FOREIGN PATENT DOCUMENTS

| | | |
|---|---|---|
| CN | 1620165 A | 5/2005 |
| EP | 1 158 753 A2 | 11/2001 |
| EP | 1 471 753 A1 | 10/2004 |
| EP | 1 613 036 A1 | 1/2006 |
| JP | 2931276 | 5/1999 |
| JP | 2003-250183 | 9/2003 |
| JP | 2006-020006 | 1/2006 |
| KR | 10-2001-0026667 | 4/2001 |
| KR | 10-2004-0070554 | 8/2004 |
| WO | WO 03/023560 A2 | 3/2003 |
| WO | WO 2005/051018 A1 | 6/2005 |

OTHER PUBLICATIONS

Office Action issued Jun. 2, 2011 in Chinese Patent Application 2007-10091589 (with English translation), 12 pages.

* cited by examiner

*Primary Examiner* — Kamran Afshar
*Assistant Examiner* — Edward Zhang
(74) *Attorney, Agent, or Firm* — Oblon, Spivak, McClelland, Maier & Neustadt, L.L.P.

(57) ABSTRACT

A personal information protecting method of this invention protects personal information saved in a software program installed on a mobile terminal or in a module insertable into and removable from the mobile terminal. The software program installed on the mobile terminal or the module inserted in the mobile terminal is locked or unlocked depending on a state of the mobile terminal.

19 Claims, 8 Drawing Sheets

PERSONAL INFORMATION PROTECTING METHOD AND MOBILE TERMINAL

BACKGROUND OF THE INVENTION

1. Field of the Invention

The present invention relates to a personal information protecting method and a mobile terminal for protecting personal information saved in a software program installed on a mobile terminal or in a module insertable into and removable from the mobile terminal.

2. Description of the Related Art

As a method of locking a portable phone based on a communications status between the portable phone and a small tag, which can be retained by the user, a method disclosed in Patent Publication No. 2931276 has been heretofore known, for example.

According to this method, a usage restriction cancellation unit in the portable phone receives a signal transmitted from a small identification signal transmission unit (tag), which is retained by the user. Then, when the Received Signal Strength Indicator is not less than a predetermined threshold value, making a phone conversation or communications with the portable phone is allowed. On the other hand, when the Received Signal Strength Indicator is not greater than the predetermined threshold value, making a phone conversation or communications with the portable phone is not allowed.

However, the target to be locked in the conventional method is limited merely to a phone conversation or communications function with a portable phone in which inserted is the usage restriction cancellation unit capable of receiving a signal transmitted from a certain tag.

Accordingly, when a user leaves a portable phone, the portable phone is locked. However, there is a problem that even though the portable phone is locked, when a third party removes a user identity module (UIM) from the portable phone, and then, inserts it into another phone, the third party can refer to personal information such as a phone list saved in the UIM. Furthermore, there is another problem that the third party can even make a phone conversation or communications by use of the phone number recorded in the UIM.

Moreover, there is still another problem that even though the phone conversation or communications function of such a portable phone is locked, the third party can browse information related to personal information such as images taken by a digital camera or the like in the portable phone.

BRIEF SUMMARY OF INVENTION

Thus, the present invention has been made in view of the aforementioned problems. An object of the present invention is to provide a personal information protecting method and a mobile terminal. In this personal information protecting method and with this mobile terminal, it is possible to prevent personal information, which is saved in a mobile terminal such as a portable phone and which is such as a phone list including phone numbers stored in an insertable and removable module such as a UIM, from being accessed or browsed. Such protection of personal information is made possible by automatically locking the mobile terminal at the time the user leaves the mobile terminal.

Furthermore, in this personal information protecting method and with this mobile terminal, by retaining the locked or unlocked state of the module even when the module is removed from the mobile terminal, the leakage of, or unauthorized use of such personal information can be prevented.

A first aspect of the present invention is summarized as a personal information protecting method for protecting personal information saved in a software program installed on a mobile terminal or in a module insertable into and removable from the mobile terminal. The software program installed on the mobile terminal or the module inserted in the mobile terminal is locked or unlocked depending on a state of the mobile terminal.

In the first aspect of the present invention, when the module is removed from the mobile terminal after the module inserted in the mobile terminal is locked or unlocked, the module may remain in the locked state or unlocked state.

In the first aspect of the present invention, when the module inserted in the mobile terminal is locked, identification information of the mobile terminal in which the module is inserted may be stored in the module. When the module is inserted in a certain mobile terminal, and when the identification information of the mobile terminal stored in the module coincides with identification information of the certain mobile terminal in which the module is inserted, the module may be unlocked.

A second aspect of the present invention is summarized as a mobile terminal on which a software program is installed, and which a module is insertable into and removable from, the mobile terminal including: a controller configured to lock or unlock the software program installed on the mobile terminal, or the module inserted in the mobile terminal depending on the state of the mobile terminal.

In the second aspect of the present invention, the mobile terminal may further include a tag communication unit configured to communicate with a tag. The controller may be configured to lock or unlock the software program installed on the mobile terminal or the module inserted in the mobile terminal, by using a communications state with the tag as the state of the mobile terminal.

In the second aspect of the present invention, the controller may be configured to lock the software program installed on the mobile terminal or the module inserted in the mobile terminal, when there occurs an event in which any one of a received power of a signal transmitted from the tag, and an indicator indicating the received power becomes equal to or less than a threshold value for locking, or when there occurs an event in which the number of received signals becomes equal to or less than a predetermined number for locking, or when a predetermined period for locking elapses after one of these events occurs.

In the second aspect of the present invention, the controller may be configured to unlock the software program installed on the mobile terminal or the module inserted in the mobile terminal, when there occurs an event in which any one of a received power of a signal transmitted from the tag, and an indicator indicating the received power becomes equal to or greater than a threshold value for unlocking, or when there occurs an event in which a number of received signal becomes equal to or greater than a predetermined number for unlocking, or when a predetermined period for unlocking elapses after one of these events occurs.

In the second aspect of the present invention, the threshold value for locking and the threshold value for unlocking may take different values, respectively, the predetermined number for locking and the predetermined number for unlocking may include different values, respectively, and The predetermined period for locking, and the predetermined period for unlocking may include different values, respectively.

DETAILED DESCRIPTION OF THE INVENTION (Mobile Terminal According to First Embodiment of the Invention)

A configuration of a mobile terminal according to a first embodiment of the present invention will be explained with reference to FIGS. 1 to 3.

As a mobile terminal 10 according to the present embodiment, a portable phone including a card type terminal device such as Compact Flash® is assumed, for example. It should be noted that a management software program, such as a personal identity manager (PIM) or the like, for managing personal information or the like is installed on the mobile terminal 10 according to the present embodiment. The mobile terminal 10 is also configured in such a manner that a module such as a subscriber identity module (SIM), a user identity module (UIM), or a secure digital memory card (SID) is insertable into and removable from.

Figure 1:
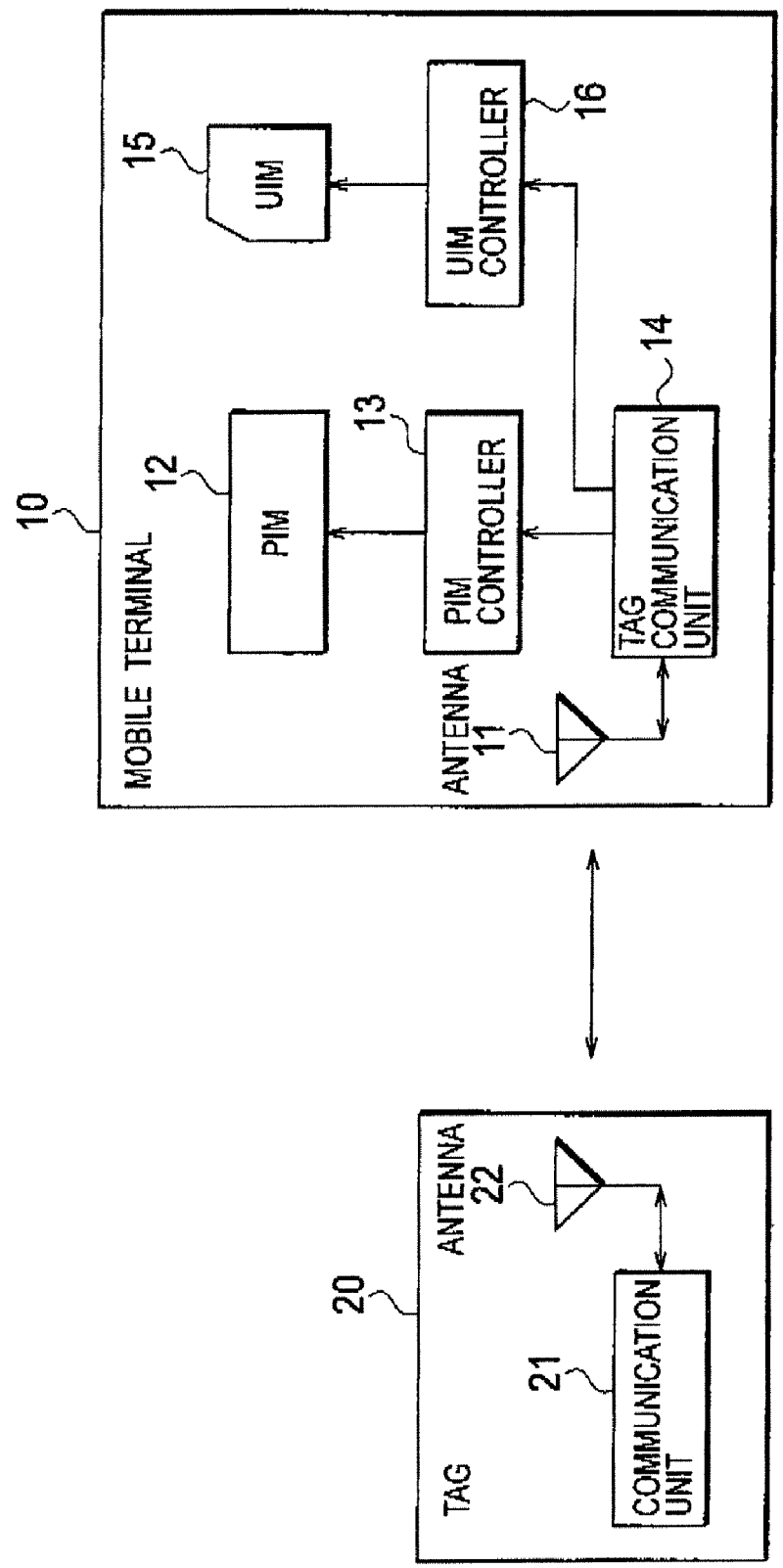
FIG. 1 shows functional block diagrams of a mobile terminal and a tag which are used in a personal information protecting method according to a first embodiment of the present invention.

As shown in FIG. 1, the mobile terminal 10 according to the present embodiment includes an antenna 11, a PIM 12, a PIM controller 13, a tag communication unit 14 configured to communicate with a tag (hereinafter referred to as "tag communication unit 14"), a UIM 15, and a UIM controller 16.

It should be noted that the mobile terminal 10 according to the present invention might be configured to include a SIT controller, and an SD card controller 16 in addition to, or instead of the PIM controller 13, and the UIM controller 16. However, for the purpose of simplifying the description, hereinafter, description as to an example of the mobile terminal 10 including only the PIM controller 13, and the UIM controller 16 will be provided.

The tag communication unit 14 is configured to communicate with a tag 20 via the antenna 11.

Specifically, the tag communication unit 14 is configured to receive a signal transmitted periodically from a communication unit 21 of the tag 20 via an antenna 22, and then to output received power of the received signal or an indicator (a received signal strength indicator (RSSI)) which indicates the received power to the PIM controller 13, and the UIM controller 16.

Furthermore, the tag communication unit 14 may be configured to receive, and then to measure a signal (a tag ID or a piece of data) periodically transmitted from the communication unit 21 of the tag 20 via the antenna 22, and then, to output the number of received signals within a predetermined period to the PIM controller 13, and the UIM controller 16.

Figure 2A:
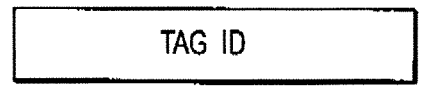
FIGS. 2A and 2B are diagrams for explaining signals each including a tag ID transmitted from a tag used in the personal information protecting method according to the first embodiment of the present invention.
Figure 2B:
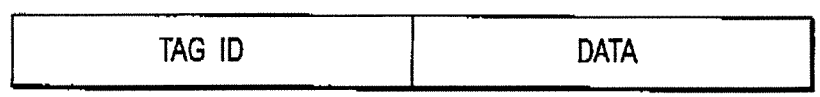

Here, as shown in FIG. 2A, the signal transmitted from the tag may be configured of only a tag ID for identifying the tag 20, or of a tag ID and a piece of data as shown in FIG. 2B.

It should be noted that although in some cases parity for error control is added to the signal for recovering a bit error occurring due to noises or the like, the explanation thereof is omitted in this description since this is not part of the fundamental issue in the description of the embodiment.

Moreover, the tag communication unit 14 may be configured to output the aforementioned received power, the RSSI, the number of received signals, or the like to the PIM controller 13, and the UIM controller 16 when a predetermined period for locking elapses after the occurrence of an event A in which the received power of the signal transmitted from the tag 20 or the RSSI indicating the received power becomes equal to or less than a threshold value for locking, or after the occurrence of an event B in which the number of received signals transmitted from the tag 20 becomes equal to or less than the predetermined number for locking.

Furthermore, the tag communication unit 14 may be configured to output the aforementioned received power, the RSSI, the number of received signals, or the like to the PIM controller 13 and the UIM controller 16 when a predetermined period for unlocking elapses after the occurrence of an event C in which the received power of the signal transmitted from the tag 20 or the RSSI indicating the received power becomes equal to or greater than a threshold value for unlocking, or after the occurrence of an event D in which the number of received signals transmitted from the tag 20 becomes equal to or greater than the predetermined number for unlocking.

Depending on a state of the mobile terminal 10, the PIM controller 13 is configured to lock or unlock the PIM 12 installed on the mobile terminal 10.

Specifically, the PIM controller 13 is configured to lock or unlock the PIM 12 installed on the mobile terminal 10 by using a communications state with the tag 20 as the state of the mobile terminal 10.

To be more specific, the PIM controller 13 is configured to lock the PIM 12 installed on the mobile terminal 10 when the event A occurs, or when the event B occurs, or when the predetermined period for locking elapses after any one of the events A and B occurs. In the event A, the received power of the signal transmitted from the tag 20, or the RSSI indicating the received power becomes equal to or less than the threshold value for locking. In the event B, the number of received signals transmitted from the tag 20 becomes equal to or less than the predetermined number for locking.

Furthermore, the PIM controller 13 is configured to unlock the PIM 12 installed on the mobile terminal 10 when the event C occurs, or when the event D occurs, or when the predetermined period for unlocking elapses after any one of the events C and D occurs. In the event C, the received power of the signal transmitted from the tag 20, or the RSSI indicating the received power becomes equal to or greater than the threshold value for unlocking. In the event D, the number of signals transmitted from the tag 20 becomes equal to or greater than the predetermined number for unlocking.

Figure 3:
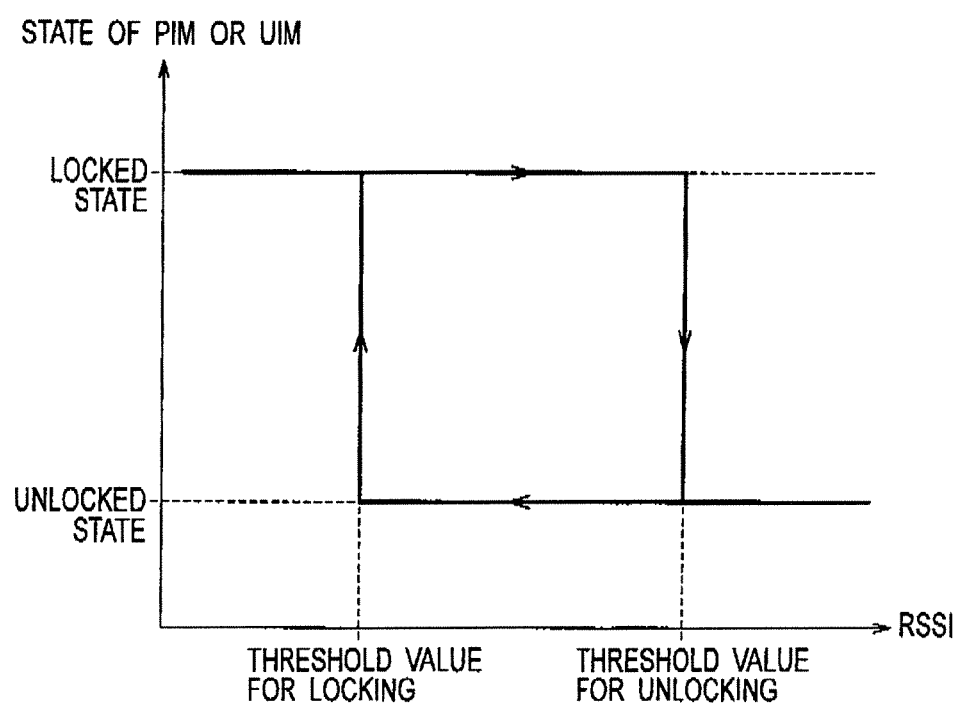
FIG. 3 is a diagram for explaining a threshold value for locking and a threshold value for unlocking, which are used in the personal information protecting method according to the first embodiment of the present invention.

For example, as shown in FIG. 3, the PIM controller 13 controls the locking or the unlocking of the PIM 12 based on the threshold values for locking and unlocking which are set in advance, the RSSI input from the tag communication unit 14, and the current state of the PIM (locked state or unlocked state).

Here, the PIM controller 13 is configured to measure the predetermined periods for locking and unlocking by use of a timer. Accordingly, by setting the values of the timer appropriately, it is possible to avoid the situation where the PIM 12 is unnecessarily locked when a user leaves a desk just for a while with the mobile terminal 10 left on the desk.

Moreover, security can be further improved by configuring, when the RSSI becomes equal to or greater than the threshold value for unlocking, the PIM controller 13 to cause a screen requesting a user to input a password to be displayed, and then, to unlock the PIM 12 only when the user inputs a correct password (including a PIN code).

It should be noted that although the description has been given as to the example in which the PIM controller 13 is configured to both lock and unlock the PIM 12 based on the RSSI or the like related to the received power of the signal transmitted from such an aforementioned tag, the PIM controller 13 may otherwise be configured to either lock or unlock the PIM 12 based on the RSSI or the like related to the received power of the signal transmitted from such an aforementioned tag. In such a case, the PIM controller 13 is configured to either lock or unlock the PIM 12 based on the input of the password by the user.

By following the control of the PIM controller 13, the PIM 12 executes a locking or unlocking operation in order to prevent the browsing of personal information such as the content of a phone book or mail, or electronic mail addresses, a schedule, an image taken by a digital camera, i-appli®, or call history showing incoming calls and outgoing calls.

Depending on the state of the mobile terminal 10, the UIM controller 16 is configured to lock or unlock the UIM 15 inserted in the mobile terminal 10.

Specifically, the UIM controller 16 is configured to lock or unlock the UIM 15 inserted in the mobile terminal 10 by using a communications state with the tag 20 as the state of the mobile terminal 10.

To be more specific, the UIM controller 16 is configured to lock the UIM 15 inserted in the mobile terminal 10 when the event A occurs, or when the event B occurs, or when the predetermined period for locking elapses after any one of the events A and B occurs. In the event A, the received power of the signal transmitted from the tag 20, or the RSSI indicating the received power becomes equal to or less than the threshold value for locking. In the event B, the number of received signals transmitted from the tag 20 becomes equal to or less than the predetermined number for locking.

Furthermore, the UIM controller 16 is configured to unlock the UIM 15 inserted in the mobile terminal 10 when the event C occurs, or when the event D occurs, or when the predetermined period for unlocking elapses after any one of the events C and D occurs. In the event C, the received power of the signal transmitted from the tag 20, or the RSSI indicating the received power becomes equal to or greater than the threshold value for unlocking. In the event D, the number of received signals transmitted from the tag 20 becomes equal to or greater than the predetermined number for unlocking.

For example, as shown in FIG. 3, the UIM controller 16 controls the locking or the unlocking of the UIM 15 based on the threshold values for locking and unlocking which are set in advance, the RSSI input from the tag communication unit 14, and the current state of the UIM (locked state or unlocked state).

Here, the UIM controller 16 is configured to measure the predetermined periods for locking and unlocking by use of a timer. Accordingly, by setting the values of the timer appropriately, it is possible to avoid the situation where the UIM 15 is unnecessarily locked when a user leaves a desk just for a while with the mobile terminal 10 left on the desk.

Moreover, security can be further improved by configuring, in the case where the RSSI becomes equal to or greater than the threshold value for unlocking, the UIM controller 16 to cause a screen requesting a user to input a password to be displayed, and then, to unlock the UIM 15 only when the user inputs a correct password (including a PIN code).

It should be noted that although the description has been given as to the example in which the UIM controller 16 is configured to both lock and unlock the UIM 15 based on the RSSI or the like related to the received power of the signal transmitted from such an aforementioned tag, the UIM controller 16 may be configured to either lock or unlock the UIM 15 based on the RSSI or the like related to the received power of the signal transmitted from such an aforementioned tag. In such a case, the UIM controller 16 is configured to either lock or unlock the UIM 15 based on the input of the password by the user.

By following the control of the UIM controller 16, the UIM 15 executes a locking or unlocking operation in order to prevent the phone numbers recorded in the UIM 15 from being used. It should be noted that when the UIM 15 is in the state of being locked, no phone conversation or communications could be made independent of the kind of mobile terminal in which the UIM 15 is inserted.

In the example shown in FIG. 3, although the description has been given in the case where the threshold values for locking and unlocking used by the PIM controller 13, and the threshold values for locking and unlocking used by the UIM controller 16 are the same, different values may be used by the PIM controller 13 and the UIM controller 16, respectively.

For example, as to the UIM 15, for which further enhancement of the security thereof is considered necessary, by setting a high threshold value for unlocking the UIM 15, it is possible to configure to unlock the UIM 15 only in the state where the mobile terminal 10, and the tag 20 come into contact with each other. Thus, it is possible to make sure that the authorized user is executing the unlocking operation of the UIM 15.

Moreover, the predetermined numbers for locking and unlocking, or the predetermined periods for locking and unlocking may be set as in the aforementioned manner.

Furthermore, the PIM controller 13 and the UIM controller 16 may be configured to include different threshold values for locking and unlocking, different predetermined numbers for locking and unlocking, and different predetermined periods for locking and unlocking.

In addition, when a module such as the UIM 15 is locked or unlocked while the module is inserted in the mobile terminal 10, the module is configured to retain its locked state or unlocked state even after the module is removed from the mobile terminal 10.

As a result, even when a third party removes the UIM 15 being in the locked state from the mobile terminal 10 which is left and forgotten by the user, and then inserts the UIM 15 into another mobile terminal 10, unauthorized phone conversation or communications cannot be made.

Moreover, when a module inserted in a mobile terminal 10A is locked, the module is configured to store, therein, identification information (such as the serial number or the model number of the mobile terminal 10A) of the mobile terminal 10A in which this module has been inserted.

When the module is inserted in a mobile terminal 10B thereafter, and when the identification information of the mobile terminal 10A being stored in the module coincide with the identification information of the mobile terminal 10B, the UIM controller 16 of the mobile terminal 10B is configured to unlock the module.

It should be noted that when the identification information of the mobile terminal 10A stored in the inserted module, and the identification information of the mobile terminal 10B do not coincide with each other, the UIM controller 16 or the like of the mobile terminal 10B in which the module has been inserted may be configured to set off an alarm sound, or to automatically transmit the position information of the mobile terminal 10B to a predetermined system after the power is turned on.

(Operations of Personal Information Protecting Method According to First embodiment of Present Invention)

Hereinafter, operations of a service providing system according to the first embodiment will be explained with reference to FIGS. 4 to 12.

Firstly, the first operation of the PIM controller 13, or the UIM controller 16 (hereinafter, referred to as the controller) in the personal information protecting method according to the present embodiment will be explained with reference to FIG. 4.

Figure 4:
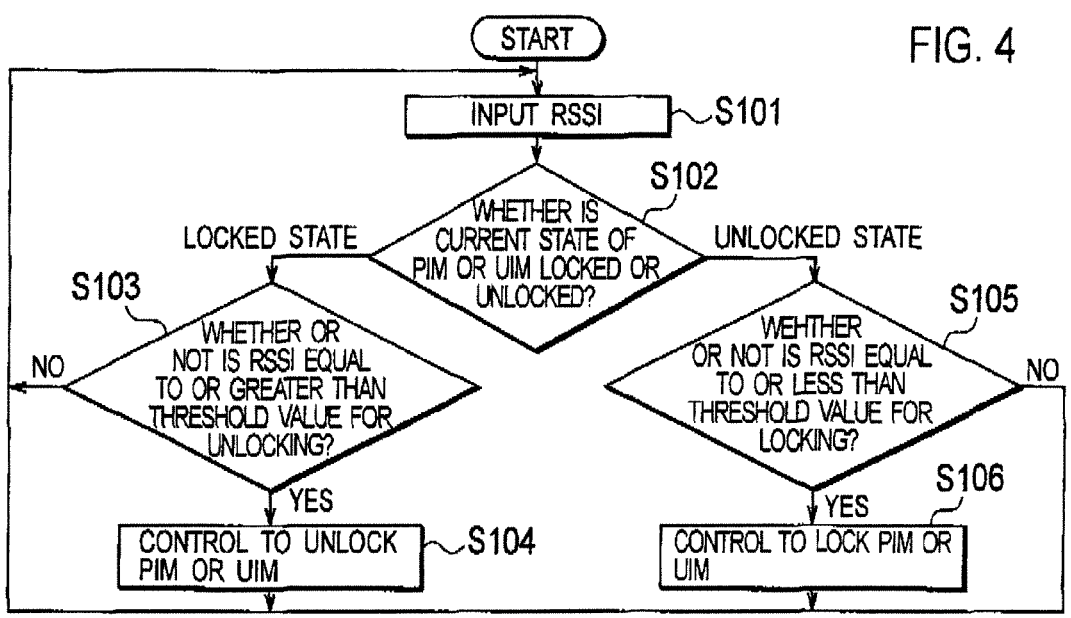
FIG. 4 is a flowchart showing an operation of the personal information protecting method according to the first embodiment of the present invention.

As shown in FIG. 4, in step S101, the controller receives, from the tag communications unit 14, an RSSI of a signal transmitted from the tag 20.

In step S102, the controller judges whether the PIM 12 or the UIM 15 is currently in the locked state, or the unlocked state. When it is in the locked state, the operation proceeds to step S103. And when it is in the unlocked state, the operation proceeds to step S105.

In step S103, the controller judges whether or not the received RSSI is equal to or greater than the threshold value for unlocking. When the received RSSI is equal to or greater than the threshold value for unlocking, the operation proceeds to step S104, otherwise, the operation returns to step S101.

In step S104, the controller unlocks the PIM 12 or the UIM 15.

In step S105, the controller judges whether or not the received RSSI is equal to or less than the threshold value for locking. When the received RSSI is equal to or less than the threshold value for locking, the operation proceeds to the step S106, otherwise, the operation returns to step S101.

In step S10, the controller locks the PIM 12 or the UIM 15.

Secondly, the second operation of the PIM controller 13, or the UIM controller 16 (hereinafter, referred to as the controller) in the personal information protecting method according to the present embodiment will be explained with reference to FIG. 5.

Figure 5:
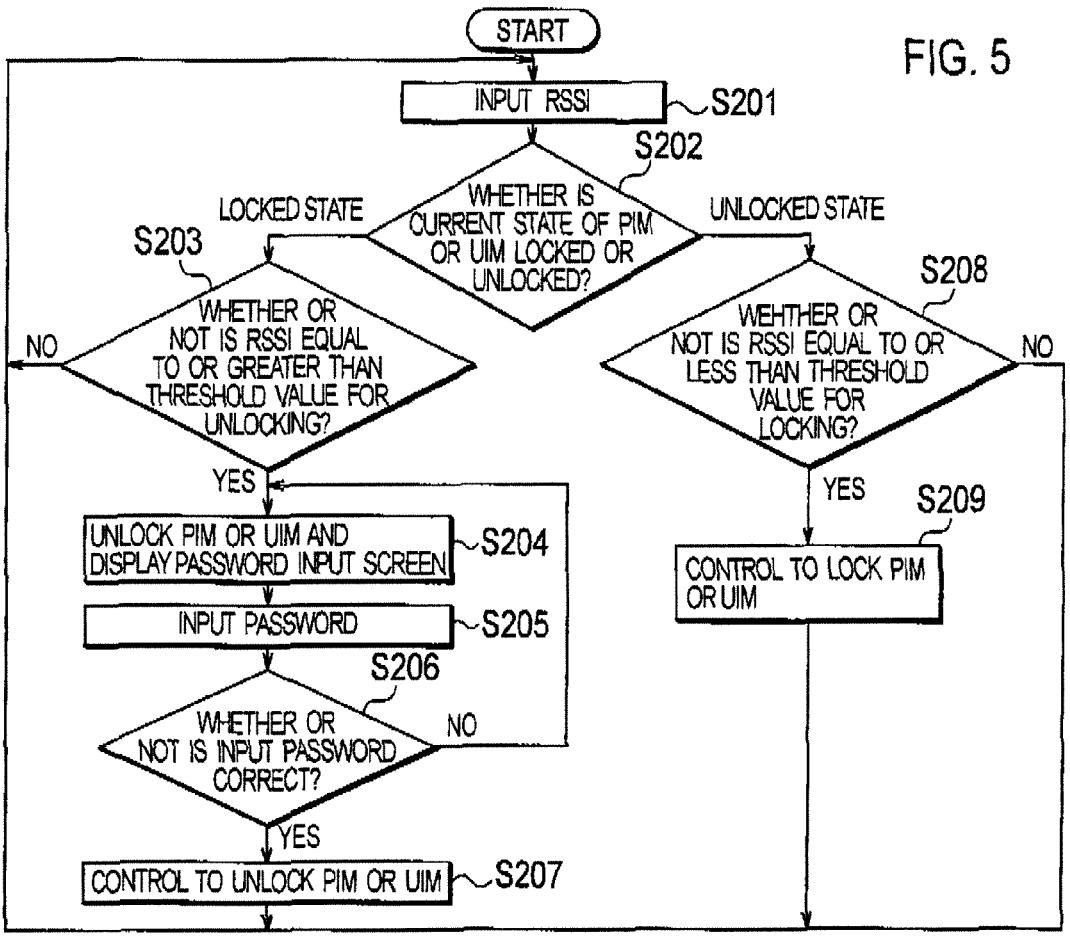
FIG. 5 is a flowchart showing an operation of the personal information protecting method according to the first embodiment of the present invention.

As shown in FIG. 5, in step S201, the controller receives, from the tag communications unit 14, an RSSI of a signal transmitted from the tag 20.

In step S202, the controller judges whether the PIM 12 or the UIM 15 is currently in the locked state, or the unlocked state. When it is in the locked state, the operation proceeds to step S203. And when it is in the unlocked state, the operation proceeds to step S208.

In step S203, the controller judges whether or not the received RSSI is equal to or greater than the threshold value for unlocking. When the received RSSI is equal to or greater than the threshold value for unlocking, the operation proceeds to step S204, otherwise, the operation returns to step S201.

In step S204, the controller causes a password input screen for unlocking the PIM 12 or the UIM 15 to be displayed. Then, in step S205, the user inputs the password to unlock the PIM 12 or the UIM 15 through the password input screen.

In step S206, when the input password is judged to be correct, the operation proceeds to step S207. When the input password is judged to be incorrect, the operation returns to step S204, and then, repeats the processing of step S204 to step S206, predetermined number.

In step S207, the controller unlocks the PIM 15 or the UIM 15.

In step S208, the controller judges whether or not the received RSSI is equal to or less than the threshold value for locking. When the received RSSI is equal to or less than the threshold value for locking, the operation proceeds to step S209, otherwise, the operation returns to step S201.

In step S209, the controller locks the PIM 12 or the UIM 15.

Thirdly, the operation of the tag communication unit 14 in the personal information protecting method according to the present embodiment will be explained with reference to FIG. 6.

Figure 6:
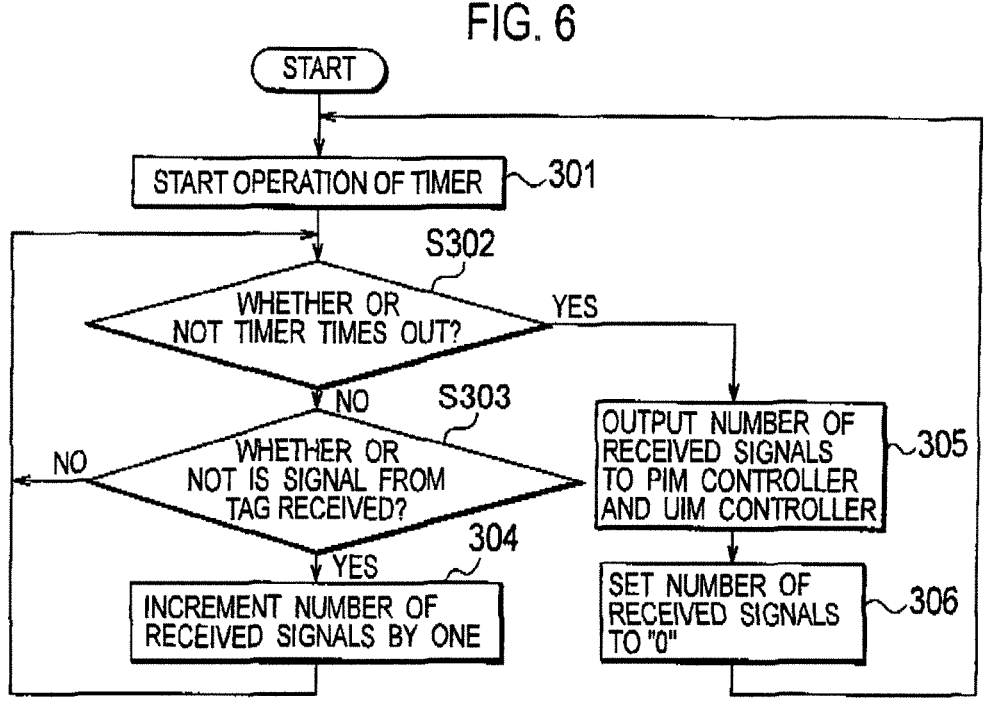
FIG. 6 is a flowchart showing an operation of the personal information protecting method according to the first embodiment of the present invention.

As shown in FIG. 6, in step S301, the tag communication unit 14 starts the operation of its timer. In step 302, when the timer times out, the operation proceeds to step S305, otherwise, the operation proceeds to step S303.

In step S303, the tag communication unit 14 judges whether or not a signal transmitted from the tag 20 is received. When it is judged that a signal is received, the operation proceeds to step S304, otherwise, the operation returns to step S302.

In step S304, the tag communication unit 14 increments the aforementioned number of received signals by one, and then, this operation returns to step S302.

In step S305, the tag communication unit 14 outputs the aforementioned number of received signals accumulated therein to the PIM controller 13 and the UIM controller 16.

In step S306, the tag communication unit 14 sets the number of received signals to "0," and then, returns to step S301.

Fourthly, the third operation of the PIM controller 13 or the UIM controller 16 (hereinafter, referred to as the controller) in the personal information protecting method according to the present embodiment will be explained with reference to FIG. 7

Figure 7:
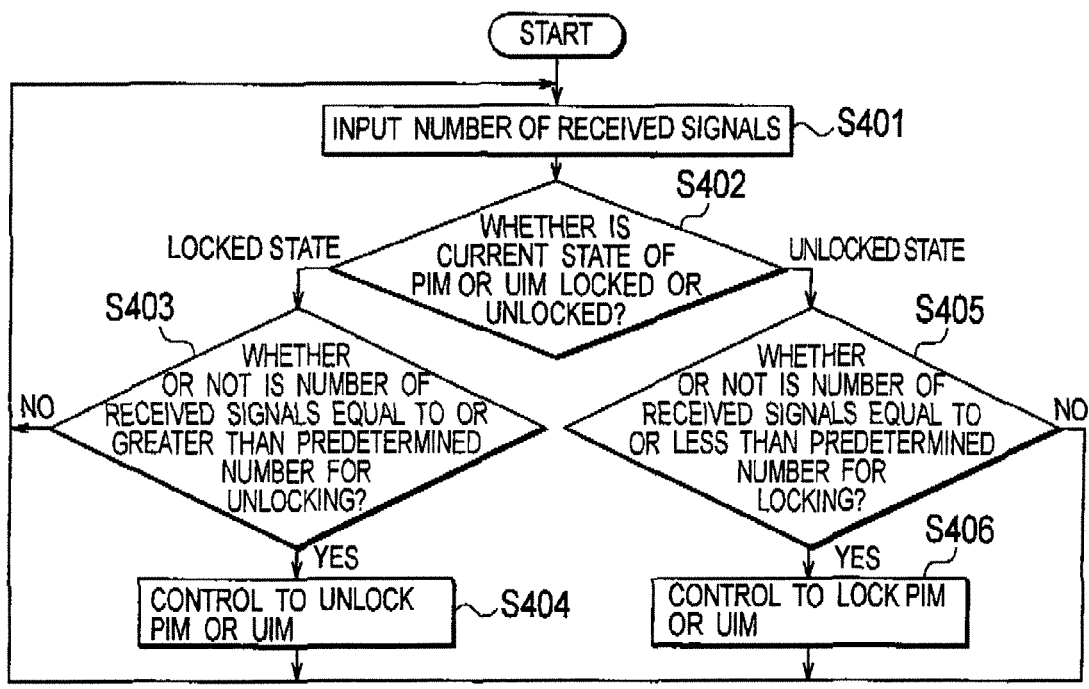
FIG. 7 is a flowchart showing an operation of the personal information protecting method according to the first embodiment of the present invention.

As shown in FIG. 7, in step S401, the controller obtains, from the tag communications unit 14, the number of received signals transmitted from the tag 20.

In step S402, the controller judges whether the PIM 12 or the UIM 15 is currently in the locked state, or the unlocked state. When it is in the locked state, the operation proceeds to step S403. And when it is in the unlocked state, the operation proceeds to step S405.

In step S403, the controller judges whether or not the number of received signals obtained is equal to or greater than the predetermined number for unlocking. When the number of received signals obtained is equal to or greater than the predetermined number for unlocking, the operation proceeds to step S404, otherwise, the operation returns to step S401.

In step S404, the controller unlocks the PIM 12 or the UIM 15.

In step S405, the controller judges whether or not the number of received signals obtained is equal to or less than the predetermined number for locking. When the number of received signals is equal to or less than the predetermined number for locking, the operation proceeds to the step S406, otherwise, the operation returns to step S401.

In step S406, the controller locks the PIM 12 or the UIM 15.

Fifthly, the fourth operation of the PIM controller 13 or the UIM controller 16 (hereinafter, referred to as the controller) in the personal information protecting method according to the present embodiment will be explained with reference to FIG. 8.

Figure 8:
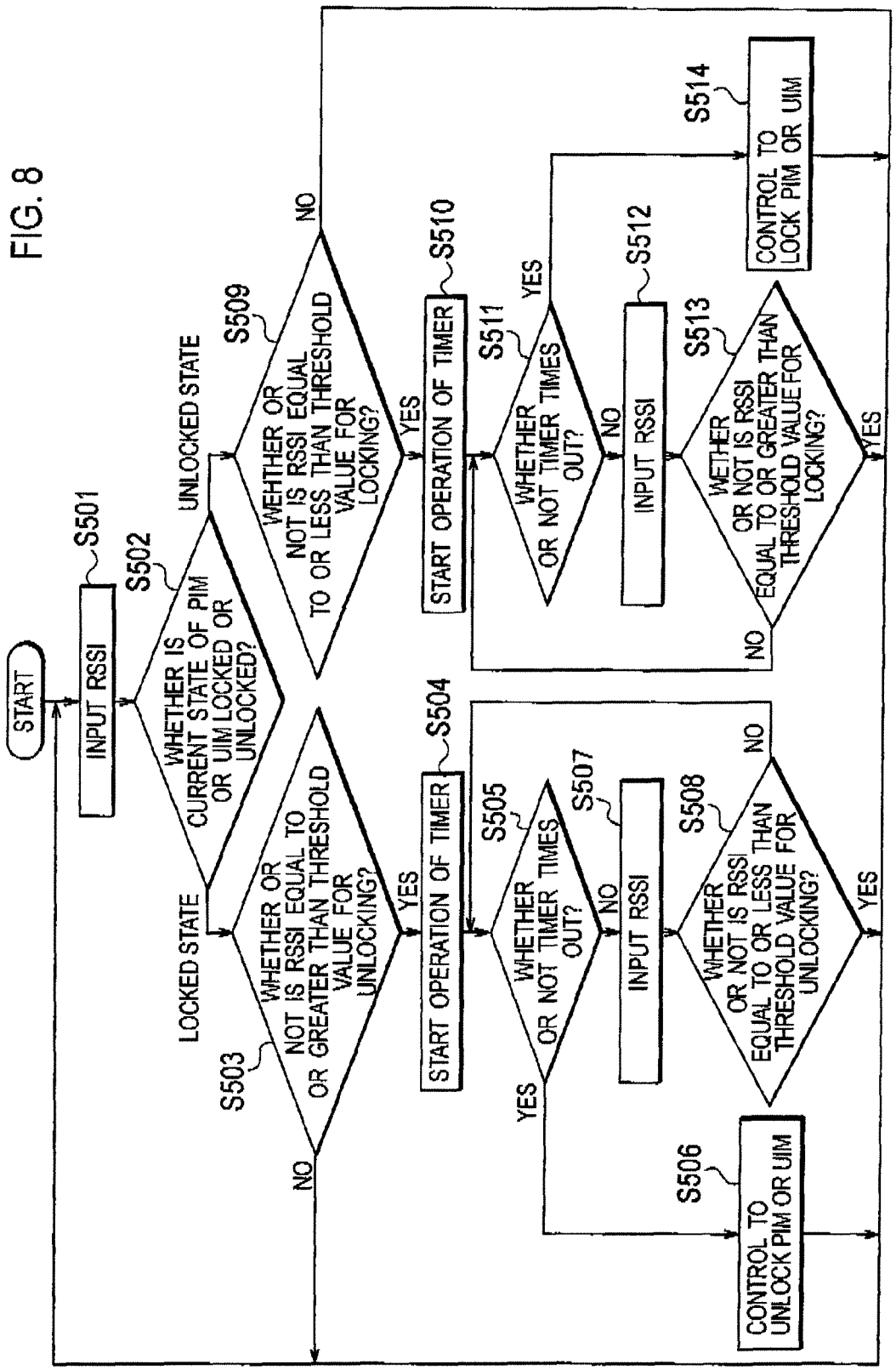
FIG. 8 is a flowchart showing an operation of the personal information protecting method according to the first embodiment of the present invention.

As shown in FIG. 8, in step S501, the controller receives, from the tag communications unit 14, an RSSI of a signal transmitted from the tag 20.

In step S502, the controller judges whether the PIM 12 or the UIM 15 is currently in the locked state, or the unlocked state. When it is in the locked state, the operation proceeds to step S503. And when it is in the unlocked state, the operation proceeds to step S509.

In step S503, the controller judges whether or not the received RSSI is equal to or greater than the threshold value for unlocking. When the received RSSI is equal to or greater than the threshold value for unlocking, the operation proceeds to step S504, otherwise, the operation returns to step S501.

In step S504, the controller starts the operation of its timer in order to measure the predetermined period for unlocking.

In step S505, when the timer times out, the operation proceeds to step S506, otherwise, the operation proceeds to step S507.

In step S506, the controller unlocks the PIM 12 or the UIM 15.

In step S507, the controller receives, from the tag communications unit 14, an RSSI of a signal transmitted from the tag 20.

In step S508, the controller judges whether or not the received RSSI is equal to or less than the threshold value for unlocking. When the received RSSI is equal to or less than the threshold value for unlocking, the operation returns to step S501, otherwise, the operation returns to step S505.

In step S509, the controller judges whether or not the received RSSI is equal to or less than the threshold value for locking. When the received RSSI is equal to or less than the threshold value for locking, the operation proceeds to step S510, otherwise, the operation returns to step S501.

In step S510, the controller starts the operation of its timer in order to measure the predetermined period for locking.

In step S511, when the timer times out, the operation proceeds to step S514, otherwise, the operation proceeds to step S512.

In step S512, the controller receives, from the tag communications unit 14, an RSSI of a signal transmitted from the tag 20.

In step S513, the controller judges whether or not the received RSSI is equal to or greater than the threshold value for locking. When the received RSSI is equal to or greater than the threshold value for locking, the operation returns to step S501, otherwise, the operation returns to step S511.

In step S514, the controller locks the PIM 12 or the UIM 15.

Sixthly, the fifth operation of the PIM controller 13 or the UIM controller 16 (hereinafter, referred to as the controller) in the personal information protecting method according to the present embodiment will be explained with reference to FIG. 9.

Figure 9:
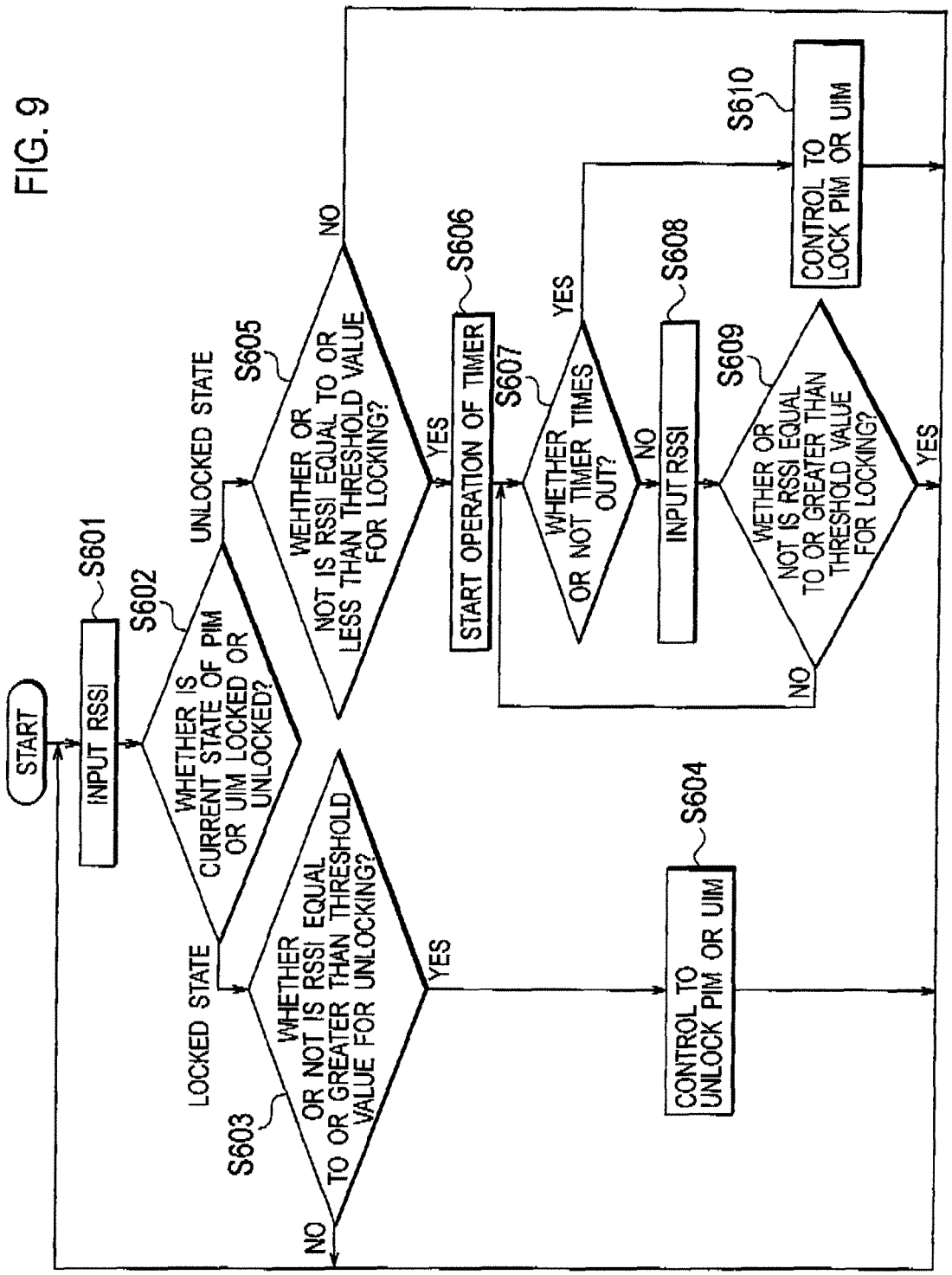
FIG. 9 is a flowchart showing an operation of the personal information protecting method according to the first embodiment of the present invention.
Figure 10:
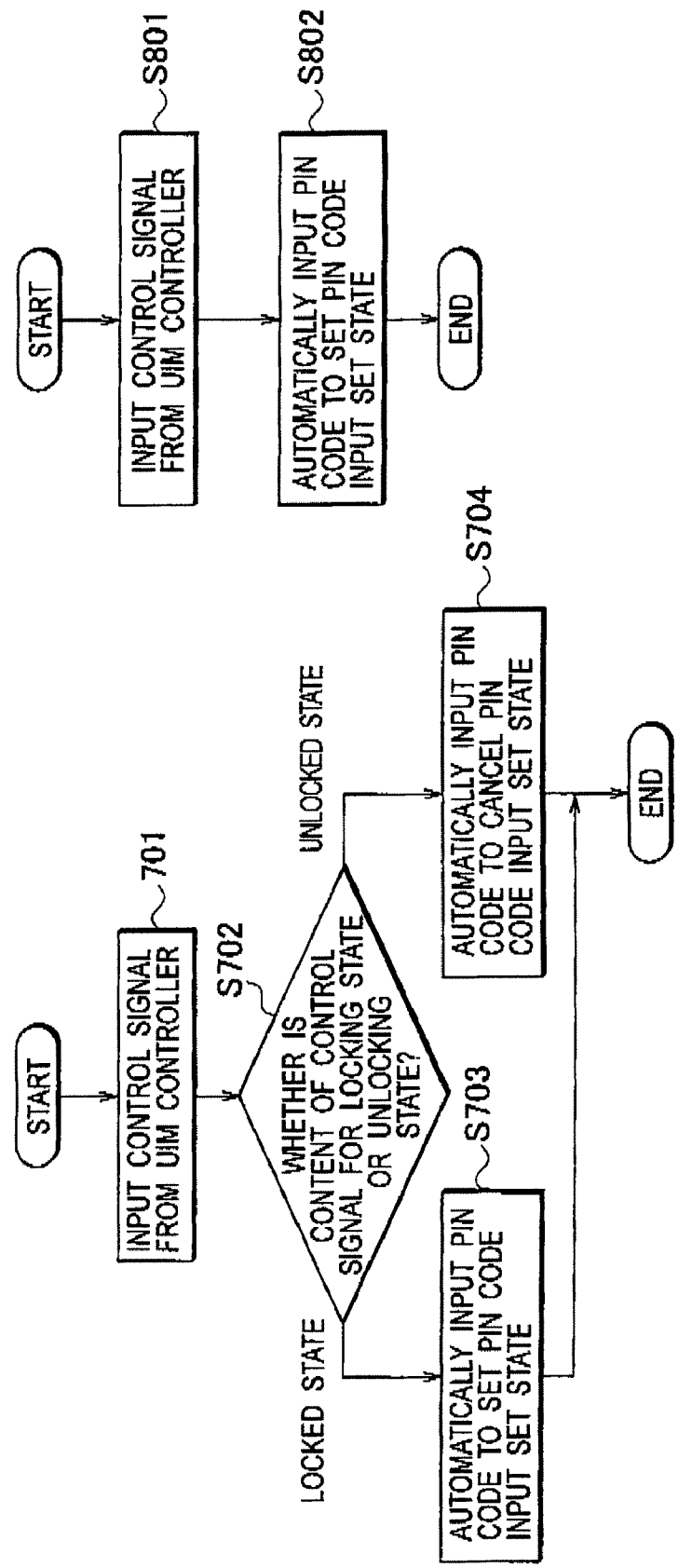
FIGS. 10A and 10B are flowcharts each showing an operation of the personal information protecting method according to the first embodiment of the present invention.

As shown in FIG. 9, in step S601, the controller receives, from the tag communications unit 14, an RSSI of a signal transmitted from the tag 20.

In step S602, the controller judges whether the PIM 12 or the UIM 15 is currently in the locked state, or the unlocked state. When it is in the locked state, the operation proceeds to step S603. And when it is in the unlocked state, the operation proceeds to step S605.

In step S603, the controller judges whether or not the received RSSI is equal to or greater than the threshold value for unlocking. When the received RSSI is equal to or greater than the threshold value for unlocking, the operation proceeds to step S604, otherwise, the operation returns to step S601.

In step S604, the controller unlocks the PIM 12 or the UIM 15.

In step S605, the controller judges whether or not the received RSSI is equal to or less than the threshold value for locking. When the received RSSI is equal to or less than the threshold value for locking, the operation proceeds to step S606, otherwise, the operation returns to step S601.

In step S606, the controller starts the operation of its timer in order to measure the predetermined period for locking.

In step S606, when the timer times out, the operation proceeds to step S610, otherwise, the operation proceeds to step S608.

In step S608, the controller receives, from the tag communications unit 14, an RSSI of a signal transmitted from the tag 20.

In step S609, the controller judges whether or not the received RSSI is equal to or greater than the threshold value for locking. When the received RSSI is equal to or greater than the threshold value for locking, the operation returns to step S601, otherwise, the operation returns to step S607.

In step S610, the controller locks the PIM 12 or the UIM 15

Seventhly, the first operation of the UIM 15 in the personal information protecting method according to the present invention will be explained with reference to FIGS. 10A and 10B.

As shown in FIG. 10A, the UIM 15 receives a control signal from the UIM controller 16 in step S701. In step S702, when the content of the control signal is one which causes the UIM 15 to be in the locked state, this operation proceeds to step S703. On the other hand, when the content of the control signal is one which causes the UIM 15 to be in the unlocked state, the operation proceeds to step S704.

In step S703, the UIM 15 automatically inputs the PIN code thereto, and thus, the UIM 15 is set to be in a PIN code input set state (locked state) in which the UIM 15 is not unlocked unless the PIN code is input thereto.

On the other hand, in step S704, the UIM 15 automatically inputs the PIN code thereto, and then, the UIM 15 cancels the PIN code input set state (locked state).

It should be noted that as shown in steps S801 and S802 of FIG. 10B, although the UIM 15 is set to be in the PIN code input set state by automatically inputting the PIN code thereto, this PIN code input set state might be cancelled by the users input of the PIN code by typing the keys.

Eighthly, the second operation of the UIM 15 in the personal information protecting method according to the present invention will be explained with reference to FIG. 11.

Figure 11:
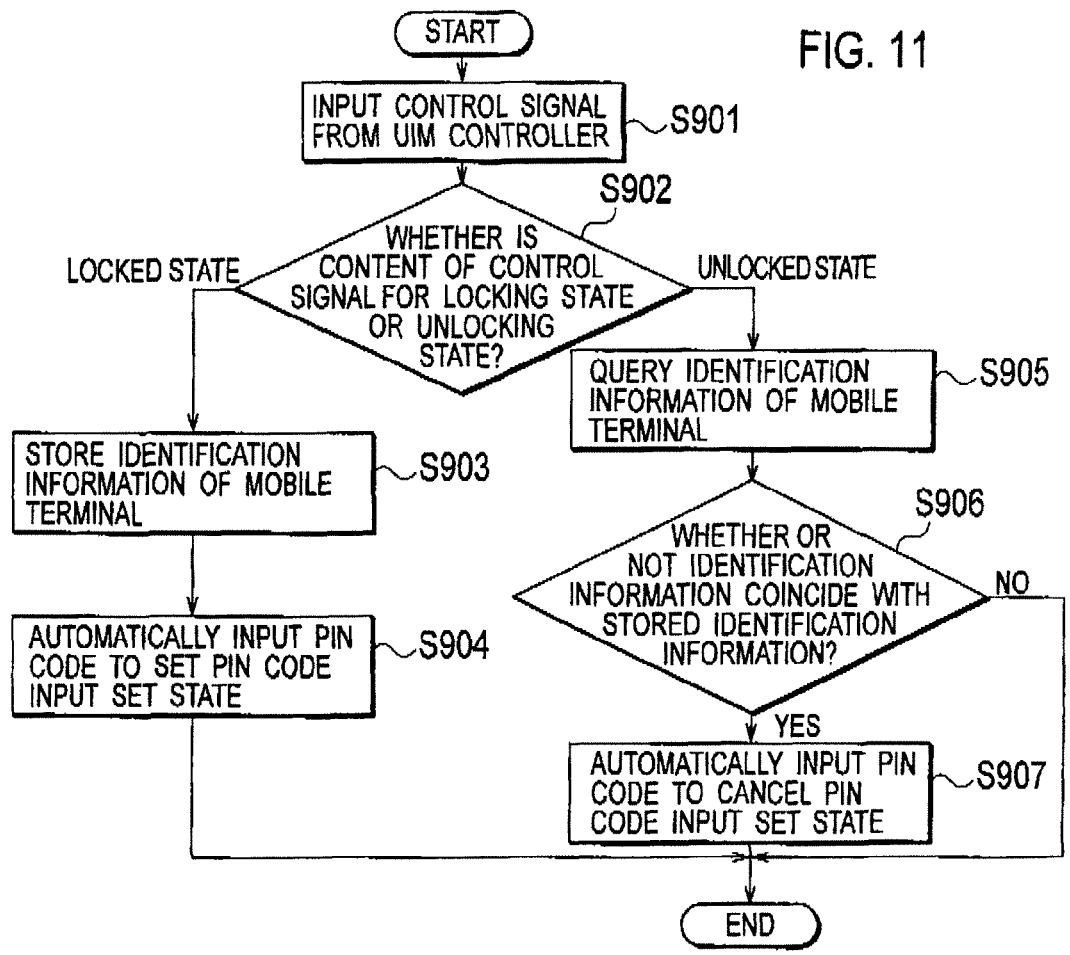
FIG. 11 is a flowchart showing an operation of the personal information protecting method according to the first embodiment of the present invention.

As shown in FIG. 11, in step S901, the UIM 15 receives a control signal from the UIM controller 16. In step S902, when the content of the control signal is one which causes the UIM 15 to be in the locked state, the operation proceeds to step S903. When the content of the control signal is one that causes the UIM 15 to be in the unlocked state, the operation proceeds to step S905.

In step S903, the UIM 15 stores the identification information of the mobile terminal A having the UIM 15 inserted therein.

In step S904, the UIM 15 automatically inputs a PIN code thereto, and thus, the UIM 15 is set to be in the PIN code input set state (locked state) in which the PIM is not unlocked unless the PIN code is input thereto.

In step S905, the UIM 15 queries the mobile terminal 10A having the UIM 15 inserted therein of the identification information of the mobile terminal 10A.

In step S906, the UIM 15 judges whether or not the identification information of the mobile terminal 10B stored therein, and the identification information of the mobile terminal 10A queried in step S905 coincide with each other.

When it is determined that the two pieces of the identification information coincide with each other, the operation proceeds to step S907, otherwise, the operation ends.

In step S907, the UIM 15 automatically inputs the PIN code, and then, cancels the PIN code input set state (locked state) being set.

(Operations and Effects of Personal Information Protecting Method and Mobile Terminal According to First Embodiment of the Invention)

According to the personal information protecting method of, and the mobile terminal of the present embodiment, when a module (such as the UIM 15) in the locked state is removed from the mobile terminal 10, and then is inserted into another mobile terminal, it is possible to prevent communications or phone conversation from being made by using the phone numbers stored in the module. Furthermore, it is possible to prevent personal information such as a phone book stored in the module from being browsed.

Furthermore, according to the personal information protecting method of, and the mobile terminal of the present embodiment, the performance of protecting personal information can be further improved because unauthorized communications or phone conversation by using phone numbers stored in the module cannot be made by a third party who does not know the identification information of the mobile terminal 10 of the authorized user, and because personal information such as a phone list stored in the module cannot be browsed by the third party.

Moreover, according to the personal information protecting method of, and the mobile terminal of the present embodiment, the personal information stored in the module can be protected also when the user holding the tag 20 is not present near the module.

Furthermore, according to the personal information protecting method of, and the mobile terminal of the present embodiment, by causing the threshold values, the predetermined number, or the predetermined periods to have a hysteresis characteristic, it is possible to avoid a problem that the locking or unlocking of the module alternately, and frequently occurs in the vicinity of the threshold values, the predetermined number, or the predetermined periods.

Second Embodiment of the Present Invention

Figure 12:
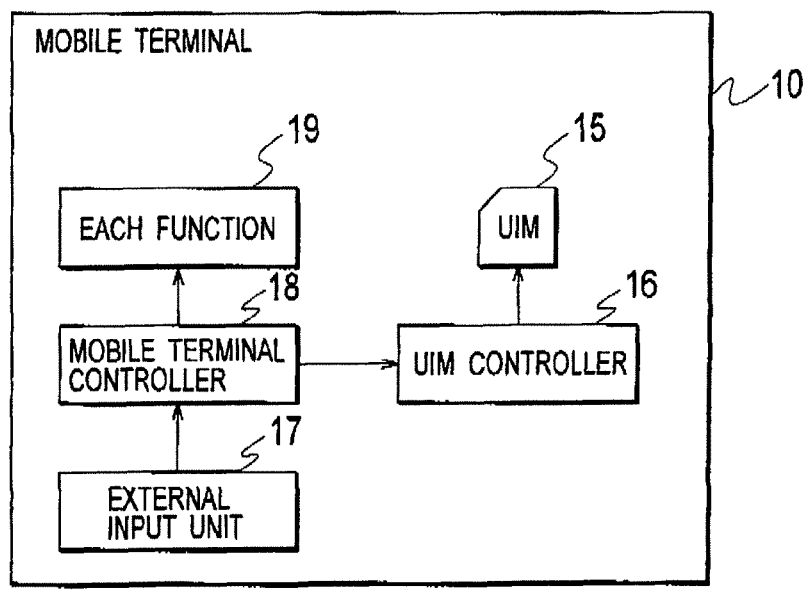
FIG. 12 is a functional block diagram of a mobile terminal and a tag used in a personal information protecting method according to a second embodiment.

The second embodiment of the present invention will be explained with reference to FIG. 12. The description as to an example of a case where a user operation locks a function of the mobile terminal 10 and at the same time locks the insertable and removable module inserted in the mobile terminal 10. In this embodiment, an example in which as the mobile terminal 10, a portable phone including a card type terminal device such as Compact Flash is used, and the UIM 15 as an insertable and removable module is used.

Specifically, when a user locks each of the functions of the mobile terminal 10 through an external input unit 17, a signal for also locking the UIM 15 is input to the UIM controller 16 by the mobile terminal controller 18, and thus, the UIM 15 is locked.

Whether or not to allow the UIM 15 to also be locked when each of the functions of the mobile terminal 10 is locked depends on the user setting of the UIM controller 16 in advance.

As in the case of the aforementioned first embodiment, even in the case where the UIM 15 being in the locked state is removed from the mobile terminal 10 being in the locked state, first, and then, is inserted into another mobile terminal, the UIM 15 remains still being locked.

Specifically, in such a case, a screen requesting the input of the PIN code is displayed, and unless the correct PIN code is input within a predetermined number, the UIM 15 cannot be unlocked.

It should be noted that in order to unlock the module, other than the PIN code, a biometric authentication method or the like might be used.

What is claimed is:

1. A personal information protecting method for protecting personal information saved in a software program installed on a mobile terminal or in a module insertable into and removable from the mobile terminal, comprising:

locking or unlocking the software program installed on the mobile terminal or the module inserted in the mobile terminal depending on a state of the mobile terminal;

maintaining the module in a locked state or an unlocked state when the module is removed from the mobile terminal after the module inserted in the mobile terminal is locked or unlocked;

storing identification information of a first mobile terminal in the module when the module, which is in the locked state, is inserted into the first mobile terminal;

when the module in the locked state is inserted in the first mobile terminal, unlocking the module since the identification information stored in the module is coincident with the identification information of the first mobile terminal; and when the module in the locked state is inserted in a second mobile terminal that has different identification information from the first mobile terminal, maintaining the locked state of the module since the identification information stored in the module is not coincident with the identification information of the second mobile terminal.

2. The personal information protecting method according to claim 1, further comprising:

communicating, through a tag communication unit, with a tag; and locking or unlocking the software program installed on the mobile terminal or the module inserted in the mobile terminal by using a communication state with the tag as the state of the mobile terminal.

3. The personal information protecting method according to claim 2, wherein the locking includes locking the software program installed on the mobile terminal or the module inserted in the mobile terminal when there occurs an event in which any one of a received power of a signal transmitted from the tag and an indicator indicating the received power becomes equal to or less than a threshold value for locking, or when there occurs an event in which a number of received signals becomes equal to or less than a predetermined number for locking, or when a predetermined period for locking elapses after one of these events occurs.

4. The personal information protecting method according to claim 2, wherein
the unlocking includes unlocking the software program installed on the mobile terminal or the module inserted in the mobile terminal when there occurs an event in which any one of a received power of a signal transmitted from the tag and an indicator indicating the received power becomes equal to or greater than a threshold value for unlocking, or when there occurs an event in which a number of received signals becomes equal to or greater than a predetermined number for unlocking, or when a predetermined period for unlocking elapses after one of these events occurs.

5. The personal information protecting method according to claim 1, further comprising:
automatically transmitting a location of the module to a predetermined station when the module is inserted in another mobile terminal and the identification information of the mobile terminal stored in the module is different from the identification information of the another mobile terminal in which the module is inserted, the automatic transmission occurring upon power up of the another mobile terminal with the module inserted in the another mobile terminal.

6. The personal information protecting method according to claim 1, wherein
an event that a received power of a signal transmitted from a tag or indicator indicating the received power becomes equal or greater than a predetermined threshold value for unlocking the module occurs simultaneously with the unlocking of the module.

7. The personal information protecting method according to claim 1, wherein
an event that a number of received signals transmitted from a tag becomes equal or greater than a predetermined number for unlocking the module occurs simultaneously with the unlocking of the module.

8. The personal information protecting method according to claim 1, wherein the unlocking the module includes unlocking the module when a predetermined period elapses after (1) a received power of a signal transmitted from a tag or indicator indicating the received power becomes equal or greater than a predetermined threshold value for unlocking the module, or after (2) a number of received signals transmitted from a tag becomes equal or greater than a predetermined number for unlocking the module.

9. The personal information protecting method according to claim 1, wherein
an event that a correct password is input occurs simultaneously with the unlocking of the module.

10. A mobile terminal on which a software program is installed, and which a module is insertable into and removable from, comprising:
a controller configured to
lock or unlock the software program installed on the mobile terminal or the module inserted in the mobile terminal depending on a state of the mobile terminal, maintain the module in a locked state or an unlocked state when the module is removed from the mobile terminal after the module inserted in the mobile terminal is locked or unlocked; and
a module controller configured to store identification information of a first mobile terminal in the module when the module, which is in the locked state, is inserted into the first mobile terminal, wherein
when the module in the locked state is inserted in the first mobile terminal, the controller unlocks the module since the identification information stored in the module is coincident with the identification information of the first mobile terminal, and
when the module in the locked state is inserted in a second mobile terminal that has different identification information from the first mobile terminal, the locked state of the module is maintained since the identification information stored in the module is not coincident with the identification information of the second mobile terminal.

11. The mobile terminal according to claim 10, further comprising:
a tag communication unit configured to communicate with a tag,
wherein the controller is configured to lock or unlock the software program installed on the mobile terminal or the module inserted in the mobile terminal by using a communications state with the tag as the state of the mobile terminal.

12. The mobile terminal according to claim 11, wherein the controller is configured to lock the software program installed on the mobile terminal or the module inserted in the mobile terminal when there occurs an event in which any one of a received power of a signal transmitted from the tag and an indicator indicating the received power becomes equal to or less than a threshold value for locking, or when there occurs an event in which a number of received signals becomes equal to or less than a predetermined number for locking, or when a predetermined period for locking elapses after one of these events occurs.

13. The mobile terminal according to claim 11, wherein the controller is configured to unlock the software program installed on the mobile terminal or the module inserted in the mobile terminal when there occurs an event in which any one of a received power of a signal transmitted from the tag and an indicator indicating the received power becomes equal to or greater than a threshold value for unlocking, or when there occurs an event in which a number of received signals becomes equal to or greater than a predetermined number for unlocking, or when a predetermined period for unlocking elapses after one of these events occurs.

14. The mobile terminal according to any one of claims 12 and 13, wherein
the threshold value for locking and the threshold value for unlocking include different values, respectively,
the predetermined number for locking and the predetermined number for unlocking include different values, respectively, and
the predetermined period for locking, and the predetermined period for unlocking include different values, respectively.

15. The mobile terminal according to claim 10, further comprising:
a transmitter of another mobile terminal configured to automatically transmit a location of the module to a predetermined station when the module is inserted in the another mobile terminal and the identification information of the mobile terminal stored in the module is different from the identification information of the another mobile terminal in which the module is inserted, wherein the transmitter automatically transmits the location of the module upon power up of the another mobile terminal with the module inserted in the another mobile terminal.

16. The mobile terminal according to claim 10, wherein the controller unlocks the module when the controller receives a power of a signal transmitted from a tag or indicator indicating the received power becomes equal or greater than a predetermined threshold value for unlocking the module.

17. The mobile terminal according to claim 10, wherein the controller unlocks the module when a number of received signals transmitted from a tag becomes equal or greater than a predetermined number for unlocking the module.

18. The mobile terminal according to claim 10, wherein the controller unlocks the module when a predetermined period has elapsed after (1) a received power of a signal transmitted from a tag or indicator indicating the received power becomes equal or greater than a predetermined threshold value for unlocking the module, or after (2) a number of received signals transmitted from a tag becomes equal or greater than a predetermined number for unlocking the module.

19. The mobile terminal according to claim 10, wherein the controller unlocks the module when a correct password is input.

* * * * *